June 7, 1927.  1,631,237
G. W. WILMOT
DRIVE CHAIN
Filed Dec. 11, 1923
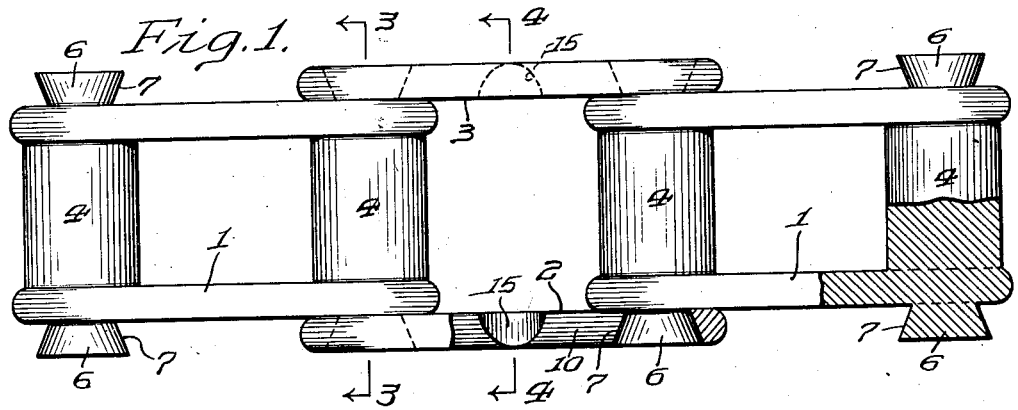
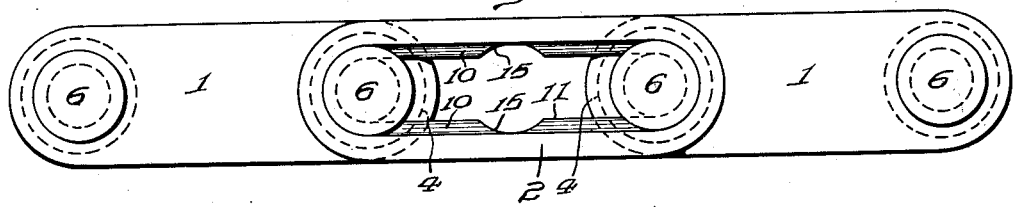
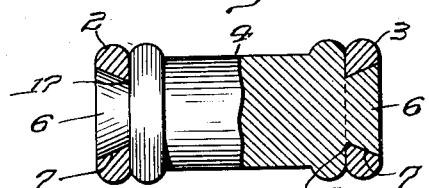 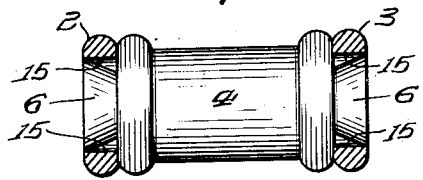
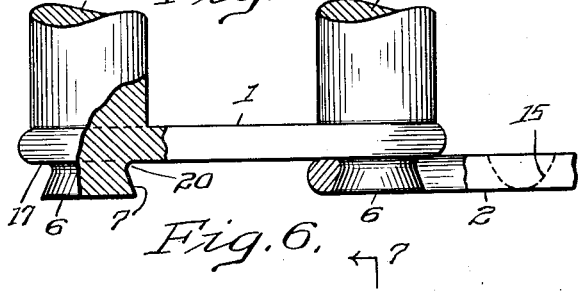 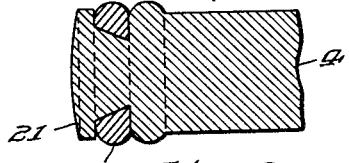
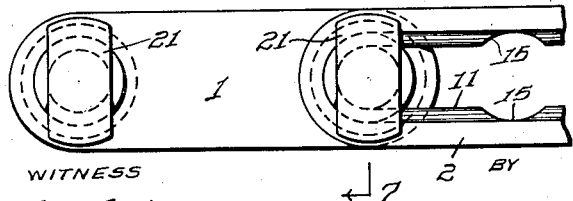 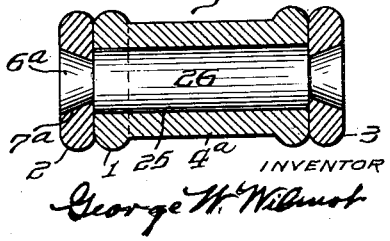
WITNESS
F. J. Hartman.
INVENTOR
George W. Wilmot
BY Anderson & Moulton
ATTORNEYS Patented June 7, 1927.

1,631,237

UNITED STATES PATENT OFFICE.

GEORGE W. WILMOT, OF HAZLETON, PENNSYLVANIA, ASSIGNOR TO WILMOT ENGINEERING COMPANY, OF HAZLETON, PENNSYLVANIA, A CORPORATION OF PENNSYLVANIA.

DRIVE CHAIN.

Application filed December 11, 1923. Serial No. 679,878.

In the use of drive chains, particularly those which are adapted for heavy duty work, the bearing surfaces between the pintles and the links and between the overlapping end portions of the links become worn so that in use connections between the chain links become loose whereby there is unnecessary rattling and noise and whereby also the chain may fail to function properly.

It is desirable that means be provided to prevent, as far as may be practically possible, the connected and contacting portions of the chain structure from becoming loose and rattling and otherwise failing to function properly as a result of wear due to operation in use.

The general object, therefore, of my invention is to provide a chain structure comprising novel means whereby the wearing of the bearing surfaces between the chain links and the pintles operate automatically to cause an inner adjustment of the side bars of the links to prevent the same from becoming loose.

A further object of the invention is to provide a chain structure comprising pintles having trunnions at their opposite ends which are tapered inwardly toward the longitudinal center of the chain and toward the axes of the said pintles, and also comprising links in which the bearing surfaces which engage the said trunnions are correspondingly inclined.

Other objects and advantages of the invention will be pointed out in the detailed description thereof which follows or will be apparent from such description.

In order that the invention may be readily understood and its practical advantages fully appreciated reference may be had to the accompanying drawing in which I have shown convenient forms of mechanical embodiment of the same. It will be understood, however, that the invention is susceptible of embodiment in other forms of construction than those shown and that changes in the details of construction may be made within the scope of the claims without departing from the said invention.

In the drawing:

Fig. 1 is a view partly in top plan and partly in horizontal section of a portion of chain structure embodying my invention;

Fig. 2 is a view in side elevation of the same;

Fig. 3 is a view taken on the line 3—3 of Fig. 1, certain portions of the structure being shown in section and others in elevation;

Fig. 4 is a transverse sectional view taken on the line 4—4 of Fig. 1;

Fig. 5 is a view partly in top plan and partly in horizontal section showing a slightly modified construction;

Fig. 6 is a view in side elevation of still another slightly modified construction;

Fig. 7 is a view taken on the line 7—7 of Fig. 6; and

Fig. 8 is a transverse sectional view showing another modified construction of chain embodying the invention.

Referring to the drawing: 1 designates solid links which are arranged alternately with respect to links comprising oppositely disposed side bars 2 and 3. The solid links 1 comprise enlarged cylindrical portions 4 at their opposite ends. The space bounded by the cylindrical portions 4 and the opposite sides of the said links 1 in the construction shown is open but may be closed by a web if desired. The said links 1 are provided with trunnions 6 which are in axial alinement with the enlarged cylindrical portions 4 at the opposite end of the said links. These trunnions are tapered or inclined inwardly, as shown at 7, so as to provide inwardly slanting or inclined bearing surfaces for engagement with correspondingly inclined or beveled surfaces 10 upon the inner edges and ends of the slots 11 which extend lengthwise of the bars 2 and 3. For the purpose of connecting and disconnecting the side bars 2 and 3 with and from the said trunnions the opposite edges of the said slots 11 at about their middles are provided with notches 15 of arcuate shape, as shown. It will be apparent that the circular outer ends of the trunnions 6 may be inserted through these notches and that after such insertion the links may be adjusted or extended with respect to each other so as to carry the said trunnions to the outer ends of the slots 11. When in such position the inwardly tapering surfaces 7 of the trunnions 6 are in engagement with the corresponding inwardly beveled surfaces 10 of the opposite end portions of the said slots.

As shown in Figs. 1 to 4 inclusive of the drawing the inwardly tapered bearing surfaces 7 of the trunnions 6 meet the surfaces of the annular shoulders 17 at the opposite ends of the enlarged cylindrical portions 4 at acute angles.

In the construction as shown in Fig. 5 the inwardly tapered surfaces 7 of the trunnions 6 merge into a small narrow fillet 20 so as to provide a sharply curved surface at the juncture between the trunnions 6 and the shoulder 17, instead of an acute angle, as shown in Figs. 1 to 4 inclusive. Otherwise the structure shown in Fig. 5 is identical with that shown in Figs. 1 to 4 inclusive.

In Figs. 6 and 7 I have shown a construction identical with that shown in Figs. 1 to 4 inclusive except that the trunnions are provided on their outer ends with elongated heads 21 which form additional security means for preventing the accidental disconnection or separation of the side bars 2 and 3 from the trunnions of the links 1. In the latter construction it will be seen that in order to assemble the side bars 2 and 3 with the links 1 it is necessary to so relate the said side bars to the said links as to dispose the heads 21 in parallel relation to the slots 11. After having been so disposed and the heads and trunnions inserted through the notches 15, the trunnions passing through the notches 15, the links then may be adjusted into extended relation with respect to each other.

In Fig. 8 I have shown a construction in which the enlarged cylindrical portions $4^a$ of the solid links 1 are provided with relatively large central openings 25 within which pinions 26 are situated. These pinions are provided at their opposite ends with trunnions $6^a$ having inwardly tapered bearing surfaces $7^a$. The side bars 2 and 3 employed in this structure are identical with the side bars disclosed in the preceding figures of the drawing and need not be further described.

It will be seen that by my invention I have provided bearing surfaces between the trunnions and the slots of the side bars of the links in pivotal engagement therewith which are tapered and inclined inwardly so that as wear takes place in use the said side bars work inwardly toward the sides of the alternate solid links and are maintained in close contact therewith until the chain may be completely worn out. It will be apparent that there will be no tendency of the chain to widen as it becomes worn in use.

Having thus described my invention, what I claim and desire to secure by Letters Patent is:

1. In a drive chain, the combination of a plurality of links arranged in overlapped end to end relation with respect to each other, the side bars of alternate links being provided with slots the edges of the outer end portions of which adjacent the opposite ends of said bars are inclined inwardly, and trunnions having connection with the other alternate links of the said chain, which trunnions are tapered inwardly to their inner ends and are in engagement with the inwardly tapered edge portions of said slots.

2. In a drive chain, the combination of a plurality of links arranged in end to end overlapped relation with respect to each other, the side bars of alternate links being provided with slots the outer end portions of which adjacent the opposite ends of the said bars being inclined inwardly, and pintles for connecting said links, said pintles being provided with trunnions which are tapered inwardly to their inner ends and which are adapted to engage the outer end portions of said slots when the chain is in extended position.

3. In a drive chain, the combination of a plurality of links arranged in end to end overlapped relation with respect to each other, alternate links of said chain comprising side bars which are situated exteriorly of the other of said links, and means for pivotally connecting the said links together and for causing the said bars of alternate links to press inwardly against the other of said links.

4. In a drive chain, the combination of a plurality of links arranged in end to end overlapped relation with respect to each other, alternate links comprising side bars which are situated exteriorly of the other links and each of which bars overlaps end portions of adjacent links, each of the said bars being provided with a slot the outer end portions of which are beveled inwardly and the edges of which slots are notched about their middle, and pintles comprising trunnions which are tapered inwardly to their inner ends for engaging the outer end portions of said slots, whereby the links are pivotally connected together.

5. In a drive chain, the combination of solid links and links comprising spaced oppositely disposed side bars, the said links being arranged alternately with respect to each other and the said solid links being provided upon their opposite sides and adjacent their opposite ends with trunnions which are tapered inwardly the tapered surfaces terminating adjacent the adjoining sides of said solid links, and the said bars each being provided with slots the outer end portions of which adjacent the opposite ends of the said bars being tapered inwardly to co-operate with the inwardly tapered trunnions when the links are assembled.

6. In a drive chain, the combination of alternately arranged single and double link members, the latter respectively comprising side bars arranged upon the opposite sides of and overlapping adjacent end portions of the said single link members, the said side bars each being provided with openings and the said single link members each being provided upon its opposite sides and adjacent its opposite ends with trunnions which are tapered inwardly to points adjacent the adjoining sides of said single link members, which trunnions are adapted to engage the said openings, substantially as described.

In testimony that I claim the foregoing as my invention, I have hereunto signed my name this 4th day of Dec., 1923.

GEORGE W. WILMOT.